United States Patent
Rösner

[19]

[11] Patent Number: 5,942,875
[45] Date of Patent: Aug. 24, 1999

[54] METHOD AND DEVICE FOR OPERATING AN ASYNCHRONOUS MACHINE

[75] Inventor: Peter Rösner, Erlangen, Germany

[73] Assignee: Siemens Aktiengesellschaft, Munich, Germany

[21] Appl. No.: 09/021,873

[22] Filed: Feb. 11, 1998

Related U.S. Application Data

[63] Continuation of application No. PCT/DE96/01467, Aug. 6, 1996.

[30] Foreign Application Priority Data

Aug. 11, 1995 [DE] Germany ............ 195 29 638

[51] Int. Cl.⁶ .................................................. H02P 1/26
[52] U.S. Cl. ........................ 318/778; 318/430; 318/493
[58] Field of Search .................. 318/430, 431, 318/493, 523, 529, 530, 712, 715, 716, 717, 718, 719, 761, 762, 778, 780

[56] References Cited

U.S. PATENT DOCUMENTS

| | | | |
|---|---|---|---|
| 3,667,012 | 5/1972 | Kilgore | 318/161 |
| 3,683,251 | 8/1972 | Pisecker | 363/37 |
| 4,074,174 | 2/1978 | Kuge | 318/732 |
| 4,132,931 | 1/1979 | Okuyama et al. | 318/732 |
| 4,277,733 | 7/1981 | Munson | 318/732 |
| 4,445,081 | 4/1984 | Kalman et al. | 318/832 |
| 4,812,730 | 3/1989 | Nakagawa et al. | 318/732 |

FOREIGN PATENT DOCUMENTS

| | | |
|---|---|---|
| 0200081A2 | 12/1986 | European Pat. Off. . |
| 0200081A3 | 12/1986 | European Pat. Off. . |
| 0203436A1 | 12/1986 | European Pat. Off. . |
| 2150531 | 4/1973 | Germany . |

OTHER PUBLICATIONS

Soviet Inventions Illustrated, SU 1116–516–A, Section El. Week 8517, Jun. 5, 1985, Derwent Publications Ltd., London.

"A High–Performance Parameter–Insensitive Drive Using a Series–Connected Wound Rotor Induction Motor", Edward Ho et al., IEEE Transactions on Industry Applications, vol. 25, No. 6, Nov./Dec. 1989, pp. 1132–1138.

"Statische Frequenzumrichter für drehzahlregelbare Maschinensätze in Wasserkraftanlagen" (static frequency converters for adjustable speed sets, Otto Warneke, Siemens AG, published in International Water Power and DAM Construction, Jun. 1995.

"The Double–Fed Induction Motor", Lecocq et al., EPE Journal, vol. 1, No. 2, Oct. 1991, pp. 103–112.

Japanese Patent Abstract No. 63117678 (Osamu), dated May 21, 1988.

"Elektrische Maschinen" (Electrical Machines), Rudolf Richter, Verlag Birkhäuser, Basel, Stuttgart, 1954, pp. 1–348.

*Primary Examiner*—Bentsu Ro
*Attorney, Agent, or Firm*—Herbert L. Lerner; Laurence A. Greenberg

[57] ABSTRACT

A method and a device for operating an asynchronous machine include controlling the rotor and the stator of the machine during start-up with respective first and second direct converter units. After the start-up the second direct converter unit is isolated from the stator and is connected to the rotor in parallel with the first direct converter unit. Therefore, direct converter units which are already available for performing a mains operation are used during start-up.

3 Claims, 1 Drawing Sheet

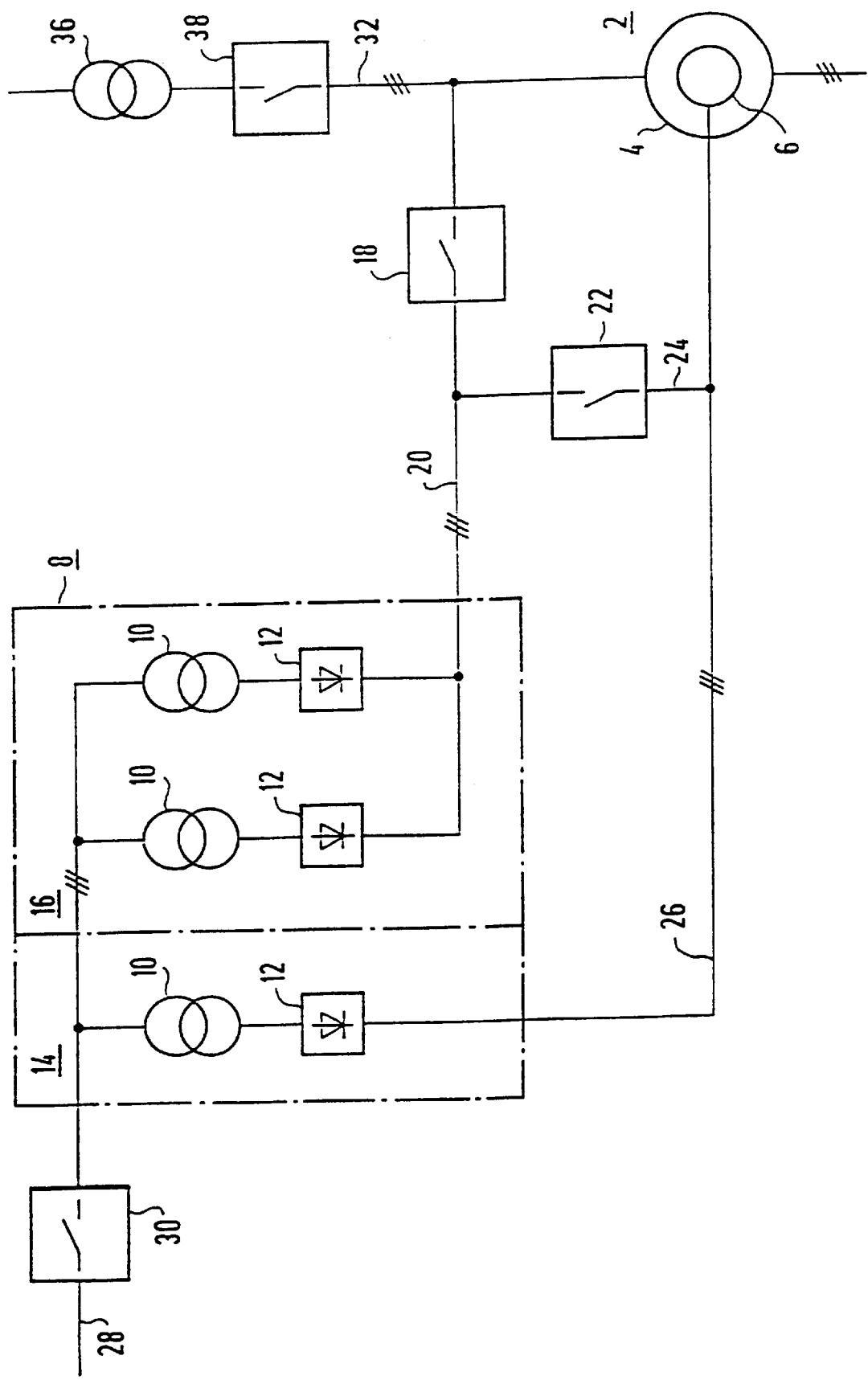

METHOD AND DEVICE FOR OPERATING AN ASYNCHRONOUS MACHINE

CROSS-REFERENCE TO RELATED APPLICATION

This application is a continuation of International Application Serial No. PCT/DE96/01467, filed Aug. 6, 1996, which designated the United States.

BACKGROUND OF THE INVENTION

Field of the Invention

The invention relates to a method and a device for operating an asynchronous machine.

Recent studies in Japan, the USA and Europe have shown that variable-speed machine sets have substantial advantages in part over fixed-speed systems. That holds true, in particular, for machine sets in hydroelectric installations with sharply fluctuating heads, in which the efficiency can be optimized by speed adjustment both in the generator mode and in the pump mode.

In hydroelectric installations having variable-speed machine sets, the machines are connected to the mains through static frequency converters. As a result the mains frequency and machine frequency are decoupled from one another.

An article entitled "Static Frequency Converters for Adjustable-Speed Sets" by O. Warneke, in International Water Power & Dam Construction, June 1995, pages 36 to 38 discloses that a double-fed variable-speed asynchronous machine with a direct converter unit is one of the converter-machine variants most frequently employed in the range of medium and high power, that is to say from about 6 MW to several hundred MW. That system can be operated both in the motor mode and in the generator mode, with adjustable speed in each case. It is also necessary in that case to start up to motor mode from a standstill. It is possible, moreover, to brake to a standstill both from motor mode and from generator mode.

An explanation in a book entitled "Die Induktionsmaschinen" ("Induction machines") by R. Richter, Verlag Birkhä user, Basel/Stuttgart (1954), Volume IV, discloses, inter alia, methods for operating machines in which the machines are optimized for doubly synchronous continuous operation.

In a first method, the stator winding and the rotor winding of the variable-speed asynchronous machine are connected in series and fed by the direct converter unit. That requires the use of additional circuit-breakers accompanied by a substantial outlay for costs.

In a second method, the stator winding and the rotor winding of the variable-speed asynchronous machine are connected in parallel. Since the ratio of the stator current to the rotor current is determined by the impedances thereof, and the asynchronous machine is optimized for mains operation, that is to say no optimization is provided with respect to start-up and braking, the result is only an inadequate torque.

Similar methods are likewise disclosed in Published European Patent Applications 0 200 081 A2 and A3 and an article entitled "A High Performance Parameter-Insensitive Drive Using a Series-Connected Wound Rotor Induction Motor" by Edward Ho and Paresh Sen, in IEEE Transactions on Industry Applications, 1989, Vo. 25, No. 6, pages 1132 to 1138.

Furthermore, German Published, Non-Prosecuted Patent Application 2 150 531, U.S. Pat. No. 4,132,931 and an article entitled "The Double-Fed Induction Motor", by D. Lecocq, D. Lataire and W. Wymeersch, in EPE Journal, Vol. 1, Issue 2, 1991, pages 103 to 112, disclose asynchronous slip ring machines which respectively have a direct converter in the stator circuit and the rotor circuit for start-up and braking.

When optimizing the machine for continuous operation with a direct converter unit, the known methods prove to have problems if the aim is to start up and brake in accordance with a doubly synchronous method.

It is normally starting motors or starting turbines, circuits for reduced-voltage starting or special starting converters with indirect converters which are used to start up the variable-speed asynchronous machine. That results in a large outlay for apparatus and funds.

SUMMARY OF THE INVENTION

It is accordingly an object of the invention to provide a method and a device for operating an asynchronous machine, which overcome the hereinafore-mentioned disadvantages of the heretofore-known methods and devices of this general type and in which only a low additional outlay for apparatus and funds is required to optimize start-up.

With the foregoing and other objects in view there is provided, in accordance with the invention, a method for operating an asynchronous machine, which comprises controlling a rotor and a stator of an asynchronous machine during start-up with respective first and second direct converter units; and isolating the second direct converter unit from the stator and connecting the second direct converter unit to the rotor in parallel with the first direct converter unit after the start-up.

With the objects of the invention in view, there is also provided a device for operating an asynchronous machine, comprising respective first and second direct converter units for starting-up a rotor and a stator of an asynchronous machine; a first switch connected upstream of the stator for isolating the second direct converter unit; and a second switch for connecting the first and second direct converter units in parallel with the rotor.

The result of this is to ensure that the control of the rotor and of the stator is matched to the different requirements of start-up and mains operation. A direct converter unit which is already available for providing the mains operation can be used for the process of starting up the variable-speed asynchronous machine. For this purpose, it is only operated in a modified way, that is to say it is split into two direct converter units. No use is made of special starting motors or starting turbines, circuits for reduced-voltage starting or special starting converters with indirect converters.

The consequence of this is an economizing effect with regard to apparatus and funds. Furthermore, there is no need for additional space. Simple switches which are not expensive in terms of apparatus can be used after termination of the start-up of the asynchronous machine to initiate switching over to mains operation.

The number of the transformers and direct converters from which the first and the second direct converter units are assembled is a function of the transformation ratio, that is to say the ratio between the respective winding numbers $w_S$ and $w_L$ of the stator and the rotor of the variable-speed asynchronous machine.

In accordance with another mode of the invention, there is provided a method which comprises controlling a stator current $I_S$ and a rotor current $I_L$ with the first and second direct converter units to a ratio $I_S w_S/I_L w_L=1$, wherein $w_S$ and $w_L$ are respective prescribed winding numbers of the stator and the rotor.

If the stator current $I_S$ and the rotor current $I_L$ are optimized to the ratio, the result is an adequate torque and reduced-voltage start-up from a standstill in the time required by the user. Braking is performed by using the same circuit with appropriate control of the two direct converter units, with the result that the braking torque can be freely adjusted in accordance with operational requirements. The first and second direct converter units are thus individually matched to the transformation ratio of the variable-speed asynchronous machine.

Other features which are considered as characteristic for the invention are set forth in the appended claims.

Although the invention is illustrated and described herein as embodied in a method and a device for operating an asynchronous machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The FIGURE of the drawing is a schematic and block circuit diagram of an exemplary embodiment of a device for operating an asynchronous machine according to the invention.

DESCRIPTION OF THE PREFERRED EMBODIMENTS

Referring now in detail to the single FIGURE of the drawing, there is seen a direct converter unit 8 which is split into respective first and second direct converter units 14 and 16. The direct converter unit 8 includes series-connected converter transformers 10 and direct converters 12.

The direct converter unit 8, which is already available for laying out the mains operation, is used to start up and/or brake an asynchronous machine 2. The direct converter unit 8 is only operated in a modified way, that is to say it is split in this case into the two direct converter units 14 and 16. No use is made of special starting motors or starting turbines, circuits for reduced-voltage starting or special starting converters with indirect converters. The consequence thereof is an economizing effect with respect to apparatus and funds.

The three-phase current is fed directly from the mains into the respective first and second direct converter units 14 and 16, through a power supply line 28 with a first mains switch 30. The three-phase current can also be fed through a mains transformer, as an alternative.

The first direct converter unit 14 feeds through a line 26 into a rotor 6 of the asynchronous machine 2. The second direct converter unit 16 feeds through a line 20 into a line 32, which is connected to a stator 4 of the asynchronous machine 2.

A first switch 18 is disposed in the line 20. A line 24 branches off from the line 20 at a location between the second direct converter unit 16 and the first switch 18 and ends in the line 26 at a location between the first direct converter unit 14 and the rotor 6.

A second switch 22 is disposed in the line 24. It is possible to switch simply between start-up or braking and mains operation through the use of the two switches 18 and 22. During mains operation, the respective first and second direct converter units 14 and 16 are connected in parallel through the second switch 22 to the three-phase winding of the rotor 6. For the purpose of start-up and braking, the second direct converter unit 16 is isolated from the rotor 6 through the use of the second switch 22 and is connected to the stator 4 through the first switch 18. In this case, the rotating-field frequencies of the stator 4 and the rotor 6 are identical, with the rotating-field directions being opposite.

During mains operation, the three-phase current from the mains is fed into the stator 4 through a mains transformer 36 and the line 32. A second mains switch 38 is disposed between the mains transformer 36 and the stator 4. The line 20 is connected to the line 32 between the second mains switch 38 and the stator 4.

During start-up of the asynchronous machine 2 from a standstill, the first mains switch 30 is closed so that the two direct converter units 14 and 16 can be fed with three-phase current. The second mains switch 38 is open, that is to say during start-up the asynchronous machine 2 is fed only from the direct converter units 14 and 16. The first switch 18 is closed and the second switch 22 is open. Consequently, the stator 4 and the rotor 6 are respectively fed from the second and first direct converter units 16 and 14.

The stator current $I_S$ and the rotor current $I_L$ are controlled to a ratio:

$$I_S w_S/I_L w_L=1$$

with respective prescribed winding numbers $w_S$ and $w_L$ of the stator 4 and the rotor 6. If the stator current $I_S$ and the rotor current $I_L$ are optimized to the ratio, the result is a large torque and reduced-voltage start-up from a standstill.

After the start-up of the asynchronous machine 2, that is to say for mains operation, the second direct converter unit 16 is isolated from the stator 4 through the use of the first switch 18 and is connected to the rotor 6 in parallel with the first direct converter unit 14 through the use of the second switch 22.

The mains switch 38 is opened in order to brake the asynchronous machine 2. The circuit of the respective first and second direct converter units 14 and 16 corresponds to that during the start-up. The control of the respective first and second direct converter units 14 and 16 is provided in such a way that the kinetic energy of the asynchronous machine 2 can be fed back into the mains through the mains switch 30.

I claim:

1. A method for operating an asynchronous machine, which comprises:

controlling a rotor and a stator of an asynchronous machine during start-up with respective first and second direct converter units; and isolating the second direct converter unit from the stator and connecting the second direct converter unit to the rotor in parallel with the first direct converter unit after the start-up.

2. The method according to claim 1, which comprises controlling a stator current $I_S$ and a rotor current $I_L$ with the first and second direct converter units to a ratio $$I_S w_S/I_L w_L = 1$$

wherein $w_S$ and $w_L$ are respective prescribed winding numbers of the stator and the rotor.

3. A device for operating an asynchronous machine, comprising:

respective first and second direct converter units for starting-up a rotor and a stator of an asynchronous machine;

a first switch connected upstream of the stator for isolating said second direct converter unit; and a second switch for connecting said first and second direct converter units in parallel with the rotor.

* * * * *